United States Patent [19]

Ohishi

[11] 4,389,097
[45] Jun. 21, 1983

[54] OCULAR OPTICAL SYSTEM

[75] Inventor: Michiro Ohishi, Hatoyama, Japan

[73] Assignee: Asahi Kogaku Kogyo Kabushiki Kaisha, Tokyo, Japan

[21] Appl. No.: 214,899

[22] Filed: Dec. 9, 1980

[30] Foreign Application Priority Data

Dec. 26, 1979 [JP] Japan .................. 54-169659

[51] Int. Cl.³ ........................................... G02B 25/04
[52] U.S. Cl. ..................................... 350/410; 350/445
[58] Field of Search ............. 350/410, 423, 469, 445, 350/52

[56] References Cited

U.S. PATENT DOCUMENTS 3,182,576 5/1965 Papke ........................... 350/52
3,663,092 5/1972 Schlegel ........................ 350/410

*Primary Examiner*—John K. Corbin
*Assistant Examiner*—Rebecca D. Gass
*Attorney, Agent, or Firm*—Sughrue, Mion, Zinn, Macpeak and Seas

[57] ABSTRACT

An ocular optical system having a wide diopter adjustment range including, in order from the viewing side, a first lens component having a negative refracting power, a second lens component having a positive refracting power, a third lens component having a negative refracting power, a pentaprism and a condenser lens component. The second lens component having the positive refracting power is movable for diopter adjustment. The optical system satisfies the following conditions:

$$F_1 < 0, \ 0.7F < |F_1| < F, \quad (1)$$

$$0.35F < F_{1.2} < 0.55F, \text{ and} \quad (2)$$

$$1.4 < (\nu_2 + \nu_3)/(\nu_1 + \nu_4) < 1.8, \quad (3)$$

where F is the overall focal length of the optical system, $F_{1.2...i}$ is the resultant focal length up to the i-th lens group, and $\nu_i$ is the Abbe number of the i-th lens from the viewing side.

6 Claims, 7 Drawing Figures

OCULAR OPTICAL SYSTEM

BACKGROUND OF THE INVENTION

The present invention relates to an ocular optical system having a wide diopter adjustment range with good aberration compensation by only a slight movement of lenses.

In general, the adjustment of diopter is conducted by varying the distance from the eye point to the image to be viewed. In order to vary the distance, a viewed object is disposed on the inward or outward side of the focusing position of the ocular so as to produce an object as a virtual image or a real image at a predetermined position. For a single lens reflex camera, since the viewed object is fixed in position, the ocular or eyepiece is moved to obtain the same effect. Diopter is determined by the following equation:

$$S = -1000/(F^2/f_B),$$

where S is the diopter, F is the focal length of the ocular, and $f_B$ is the distance from the viewed object to the focusing point of the ocular lens.

As is known from the above equation, if it is desired to make the focal length of the ocular lens long or to widen the adjustment rage of the diopter, it is required to lengthen the movement of the ocular. For a common viewfinder, since the space for movement of the ocular is restricted, it is difficult to widen the diopter adjustment range.

Accordingly, an object of the present invention is to provide an ocular optical system having a high performance with a wide diopter adjustment range even in a restricted space as in a camera.

SUMMARY OF THE INVENTION

In accordance with this and other objects of the invention, there is provided an ocular optical system having a wide diopter adjustment range, including in order from the viewing side, a first lens component $G_1$ having a negative refracting power, a second lens component $G_2$ having a positive refracting power, a third lens component $G_3$ having a negative refracting power, a pentaprism P and a condenser lens component C. The second lens component $G_2$ having the positive refracting power is movable for diopter adjustment. The optical system thus assembled satisfies the following conditions:

$$F_1 < 0,\ 0.7F < |F_1| < F, \tag{1}$$

$$0.35F < F_{1,2} < 0.55F, \text{ and} \tag{2}$$

$$1.4 < (\nu_2 + \nu_3)/(\nu_1 + \nu_4) < 1.8, \tag{3}$$

where F is the overall focal length of the optical system, $F_{1,2}$ is the resultant focal length up to the second lens component, and $\nu_1$, $\nu_2$ and $\nu_3$ are the Abbe numbers of the respective optical materials from the viewing side.

DESCRIPTION OF THE PREFERRED EMBODIMENTS

Figure 1A:
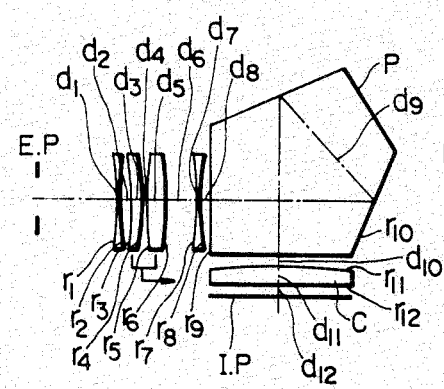
FIG. 1 is a schematic diagram showing an optical system of an embodiment according to the present invention where (a) denotes positive side diopter and (b) negative side diopter.
Figure 1B:
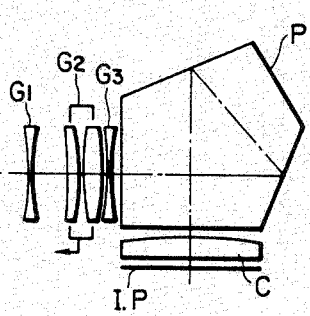
Figure 2:
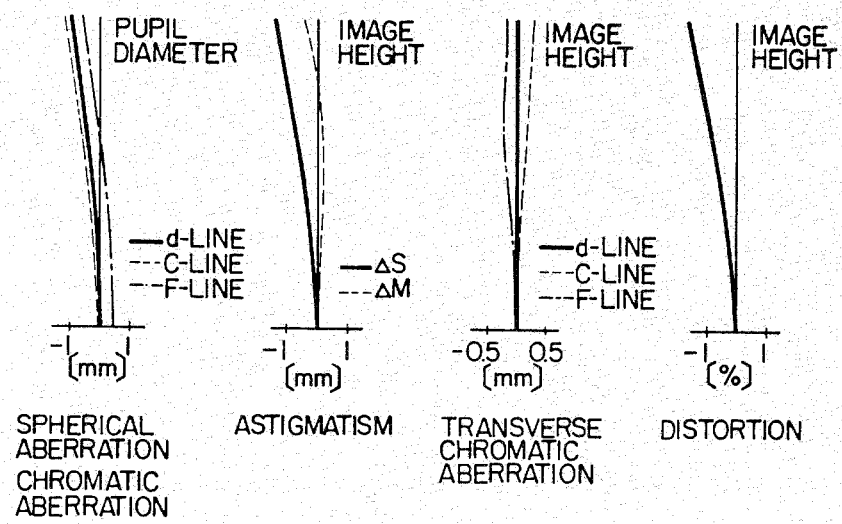
FIGS. 2 to 6, respectively, show various aberration curves based on the Examples 1 to 5.
Figure 3:
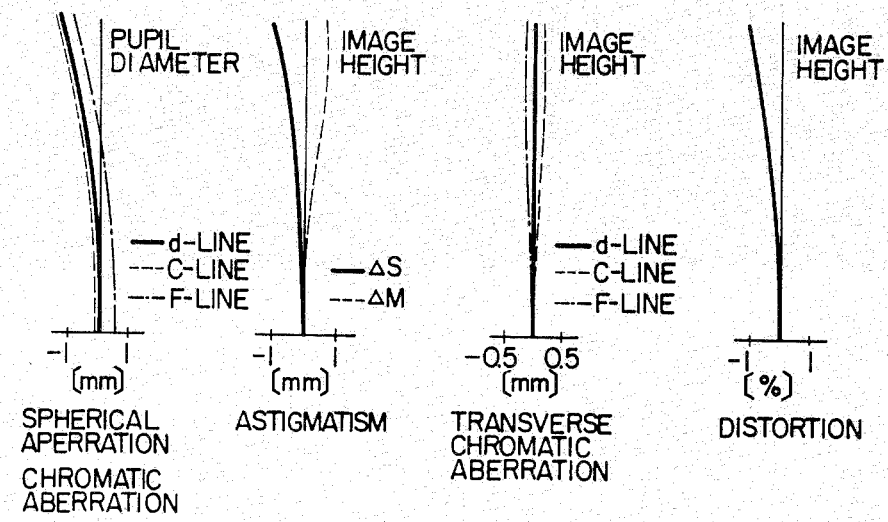
Figure 4:
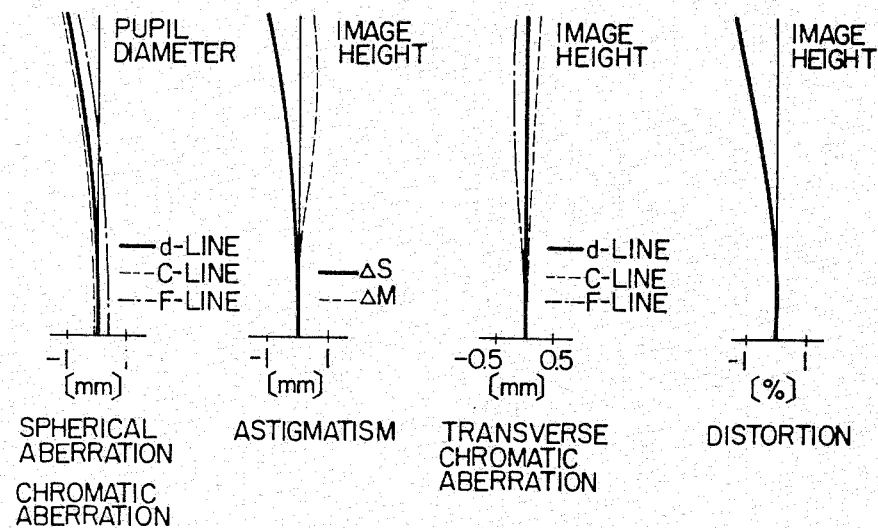
Figure 5:
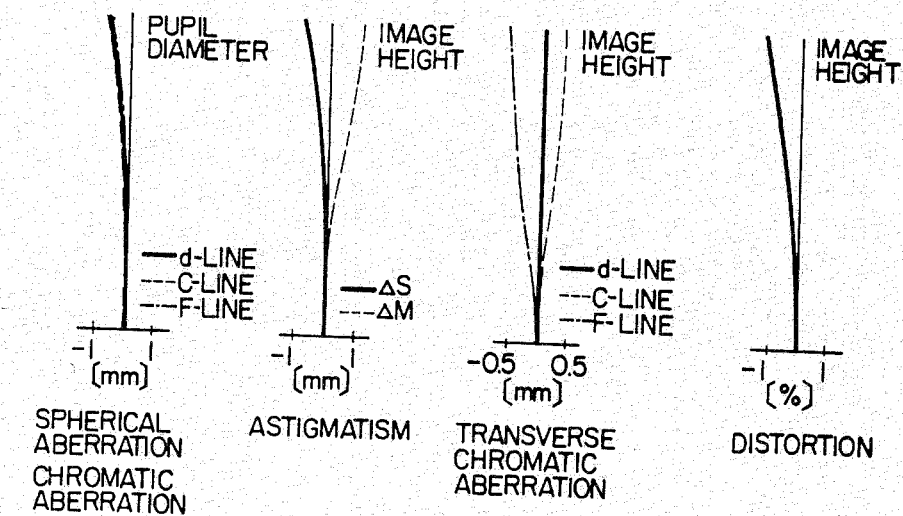
Figure 6:
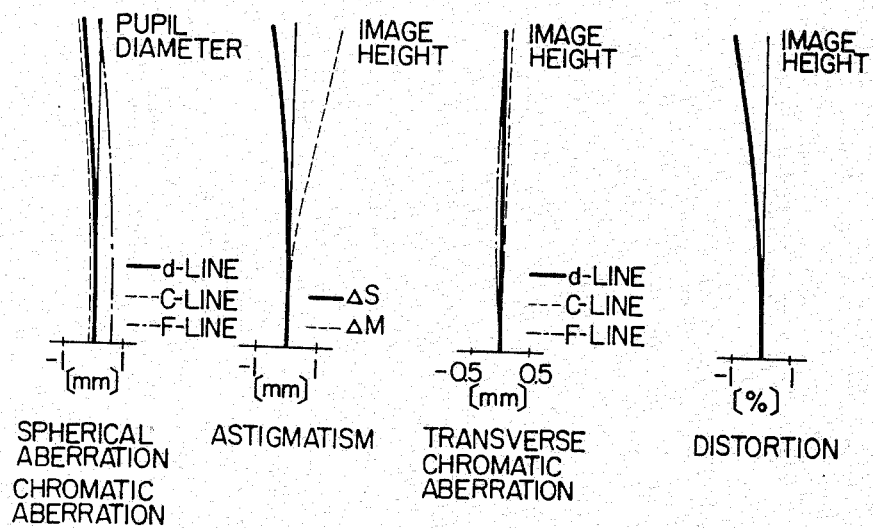

The above-specified conditions will now be explained.

The condition (1), $F_1 < 0$, $0.7F < |F_1| < F$, is required to provide a suitable refractive power for the first component $G_1$ which has a negative refractive power. The condition lengthens the optical path from the final surface of the third lens component to the focusing position thereof as compared with the overall focal length. When the lower limit of $0.7F < |F_1|$ is exceeded, the negative refractive power is remarkable. Therefore, even if the diopter range on the negative side is widened or the second lens component $G_2$ is moved for the diopter adjustment, it is possible to widen the range of diopter adjustment. It is, however, difficult to compensate for aberrations due to the rear lens component. Also, the spread of the light rays from the optical axis is increased with the lens diameters of the rear lens component increased. This makes it difficult to fit the system in a restricted space as in a camera. Inversely, when the upper limit of $|F_1| < F$ is exceeded, such is effective to compensate for aberrations due to the rear lens component, which is opposite to the effect mentioned above. It is, however, difficult to widen the diopter adjustment range.

The condition (2), $0.35F < F_{1,2} < 0.55F$, is required to provide a good balance of various aberrations and a wide diopter adjustment range. When the lower limit of $0.35F < F_{1,2}$ is exceeded, it is difficult to compensate for spherical aberration. Unless spherical aberration is well compensated for, particularly for an SLR camera, the focusing accuracy is degraded. In contrast, when the upper limit of $F_{1,2} < 0.5F$ is exceeded, it is difficult to compensate for astigmatism, distortion and the like. Unless astigmatism is compensated for, focusing by using the light ray deviation from the optical axis and the view appearance deteriorates. Unless distortion is well corrected, the frame of the view field is remarkably curved thereby generating an inferior image.

The condition (3), $1.4 < (\nu_2 + \nu_3)/(\nu_1 + \nu_4) < 1.8$, is satisfied by selecting a suitable optical material in order to achieve good chromatic compensation. When the lower limit of $1.4 < (\nu_2 + \nu_3)/(\nu_1 + \nu_4)$ is exceeded, outer transverse chromatic aberration is remarkably generated so that a spread of color is seen in outer portions of the image. When the upper limit of $(\nu_2 + \nu_3)/(\nu_1 + \nu_4) < 1.8$ is exceeded, axial chromatic aberration deteriorates which also degrades the focusing accuracy. Therefore, such a system is not suitable for an ocular.

Specific Examples of a system at a diopter of zero D will be described wherein $r_i$ is the radius of curvature of the i-th lens from the viewing side, $d_i$ is the distance between adjacent lenses or the lens thickness of the i-th lens from the viewing side, $N_i$ is the refractive index at the d-line of the i-th lens from the viewing side and $\nu_i$ is the Abbe number of the i-th lens from the viewing side.

EXAMPLE 1

| | F = 60.944 | | | | | | |
|---|---|---|---|---|---|---|---|
| $r_1$ | −55.766 | $d_1$ | 0.80 | $n_1$ | 1.76180 | $\nu_1$ | 27.1 |
| $r_2$ | 157.248 | $d_2$ | 1.96 | | | | |
| $r_3$ | −211.982 | $d_3$ | 4.37 | $n_2$ | 1.83400 | $\nu_2$ | 37.2 |
| $r_4$ | −33.560 | $d_4$ | 0.20 | | | | |
| $r_5$ | 52.212 | $d_5$ | 3.58 | $n_3$ | 1.83481 | $\nu_3$ | 39.6 |

-continued

| | | | | | | | |
|---|---|---|---|---|---|---|---|
| $r_6$ | −55.371 | $d_6$ | 2.32 | | | | |
| $r_7$ | −65.300 | $d_7$ | 1.72 | $n_4$ | 1.84666 | $\nu_4$ | 23.9 |
| $r_8$ | 82.225 | $d_8$ | 1.33 | | | | |
| $r_9$ | ∞ | $d_9$ | 81.09 | $n_5$ | 1.51633 | $\nu_5$ | 64.1 |
| $r_{10}$ | ∞ | $d_{10}$ | 1.00 | | | | |
| $r_{11}$ | 78.000 | $d_{11}$ | 3.50 | $n_6$ | 1.80518 | $\nu_6$ | 25.4 |
| $r_{12}$ | ∞ | $d_{12}$ | 1.60 | | | | |

(1) $F_1 = -0.8852F$
(2) $F_{1\cdot 2} = 0.4319F$
(3) $(\nu_2 + \nu_3)/(\nu_1 + \nu_4) = 1.569$

| diopter | $d_2$ | $d_6$ |
|---|---|---|
| −2.5 D | 4.06 | 0.22 |
| 1.5 D | 0.49 | 3.79 |

EXAMPLE 2

$F = 61.249$

| | | | | | | | |
|---|---|---|---|---|---|---|---|
| $r_1$ | −52.604 | $d_1$ | 0.80 | $n_1$ | 1.76180 | $\nu_1$ | 27.1 |
| $r_2$ | 131.327 | $d_2$ | 2.34 | | | | |
| $r_3$ | −211.969 | $d_3$ | 3.79 | $n_2$ | 1.83400 | $\nu_2$ | 37.2 |
| $r_4$ | −31.796 | $d_4$ | 0.20 | | | | |
| $r_5$ | 55.359 | $d_5$ | 3.65 | $n_3$ | 1.83481 | $\nu_3$ | 42.7 |
| $r_6$ | −50.886 | $d_6$ | 2.73 | | | | |
| $r_7$ | −67.402 | $d_7$ | 1.32 | $n_4$ | 1.84666 | $\nu_4$ | 23.9 |
| $r_8$ | 73.364 | $d_8$ | 1.45 | | | | |
| $r_9$ | ∞ | $d_9$ | 81.09 | $n_5$ | 1.51633 | $\nu_5$ | 64.1 |
| $r_{10}$ | ∞ | $d_{10}$ | 1.00 | | | | |
| $r_{11}$ | 78.000 | $d_{11}$ | 3.50 | $n_6$ | 1.80518 | $\nu_6$ | 25.4 |
| $r_{12}$ | ∞ | $d_{12}$ | 1.60 | | | | |

(1) $F_1 = -0.8034F$
(2) $F_{1\cdot 2} = 0.4234F$
(3) $(\nu_2 + \nu_3)/(\nu_1 + \nu_4) = 1.569$

| diopter | $d_2$ | $d_6$ |
|---|---|---|
| −3.0 D | 4.84 | 0.23 |
| 1.5 D | 0.81 | 4.26 |

EXAMPLE 3

$F = 62.209$

| | | | | | | | |
|---|---|---|---|---|---|---|---|
| $r_1$ | −50.743 | $d_1$ | 0.81 | $n_1$ | 1.76180 | $\nu_1$ | 27.1 |
| $r_2$ | 117.935 | $d_2$ | 2.78 | | | | |
| $r_3$ | −179.820 | $d_3$ | 2.88 | $n_2$ | 1.83400 | $\nu_2$ | 37.2 |
| $r_4$ | −32.352 | $d_4$ | 0.10 | | | | |
| $r_5$ | 52.848 | $d_5$ | 3.89 | $n_3$ | 1.83481 | $\nu_3$ | 42.7 |
| $r_6$ | −51.064 | $d_6$ | 3.64 | | | | |
| $r_7$ | −61.451 | $d_7$ | 0.79 | $n_4$ | 1.84666 | $\nu_4$ | 23.9 |
| $r_8$ | 89.437 | $d_8$ | 1.33 | | | | |
| $r_9$ | ∞ | $d_9$ | 81.09 | $n_5$ | 1.51633 | $\nu_5$ | 64.1 |
| $r_{10}$ | ∞ | $d_{10}$ | 1.00 | | | | |
| $r_{11}$ | 78.000 | $d_{11}$ | 3.50 | $n_6$ | 1.80518 | $\nu_6$ | 25.4 |
| $r_{12}$ | ∞ | $d_{12}$ | 1.60 | | | | |

(1) $F_1 = -0.7471$
(2) $F_{1\cdot 2} = 0.4339$
(3) $(\nu_2 + \nu_3)/(\nu_1 + \nu_4) = 1.569$

| diopter | $d_2$ | $d_6$ |
|---|---|---|
| −3.0 D | 5.61 | 0.82 |
| 1.5 D | 0.81 | 5.54 |

EXAMPLE 4

$F = 63.235$

| | | | | | | | |
|---|---|---|---|---|---|---|---|
| $r_1$ | −70.000 | $d_1$ | 0.80 | $n_1$ | 1.74077 | $\nu_1$ | 27.8 |
| $r_2$ | 116.372 | $d_2$ | 2.73 | | | | |
| $r_3$ | −100.000 | $d_3$ | 2.27 | $n_2$ | 1.88300 | $\nu_2$ | 40.8 |
| $r_4$ | −33.300 | $d_4$ | 0.2 | | | | |
| $r_5$ | 47.480 | $d_5$ | 3.41 | $n_3$ | 1.80440 | $\nu_3$ | 47.4 |
| $r_6$ | −62.240 | $d_6$ | 3.75 | | | | |

-continued

| | | | | | | | |
|---|---|---|---|---|---|---|---|
| $r_7$ | −69.147 | $d_7$ | 0.80 | $n_4$ | 1.78472 | $\nu_4$ | 25.7 |
| $r_8$ | 82.000 | $d_8$ | 1.18 | | | | |
| $r_9$ | ∞ | $d_9$ | 81.09 | $n_5$ | 1.51633 | $\nu_5$ | 64.1 |
| $r_{10}$ | ∞ | $d_{10}$ | 1.00 | | | | |
| $r_{11}$ | 78.000 | $d_{11}$ | 3.50 | $n_6$ | 1.80518 | $\nu_6$ | 25.4 |
| $r_{12}$ | ∞ | $d_{12}$ | 1.60 | | | | |

(1) $F_1 = -0.9314F$
(2) $F_{1\cdot 2} = 0.4615F$
(3) $(\nu_2 + \nu_3)/(\nu_1 + \nu_4) = 1.475$

| diopter | $d_2$ | $d_6$ |
|---|---|---|
| −3.0 D | 5.74 | 0.73 |
| 1.5 D | 0.74 | 5.62 |

EXAMPLE 5

$F = 63.207$

| | | | | | | | |
|---|---|---|---|---|---|---|---|
| $r_1$ | −80.500 | $d_1$ | 0.80 | $n_1$ | 1.80518 | $\nu_1$ | 25.4 |
| $r_2$ | 115.895 | $d_2$ | 2.74 | | | | |
| $r_3$ | −100.000 | $d_3$ | 2.27 | $n_2$ | 1.88300 | $\nu_2$ | 40.8 |
| $r_4$ | −33.300 | $d_4$ | 0.2 | | | | |
| $r_5$ | 47.480 | $d_5$ | 3.41 | $n_3$ | 1.81600 | $\nu_3$ | 46.6 |
| $r_6$ | −64.350 | $d_6$ | 3.73 | | | | |
| $r_7$ | −69.147 | $d_7$ | 0.8 | $n_4$ | 1.80518 | $\nu_4$ | 25.4 |
| $r_8$ | 87.000 | $d_8$ | 1.18 | | | | |
| $r_9$ | ∞ | $d_9$ | 81.09 | $n_5$ | 1.51633 | $\nu_5$ | 64.1 |
| $r_{10}$ | ∞ | $d_{10}$ | 1.00 | | | | |
| $r_{11}$ | 78.000 | $d_{11}$ | 3.50 | $n_6$ | 1.80518 | $\nu_6$ | 25.4 |
| $r_{12}$ | ∞ | $d_{12}$ | 1.60 | | | | |

(1) $F_1 = -0.9317F$
(2) $F_{1\cdot 2} = 0.4617F$
(3) $(\nu_2 + \nu_3)/(\nu_1 + \nu_4) = 1.720$

| diopter | $d_2$ | $d_6$ |
|---|---|---|
| −3.0 D | 5.76 | 0.71 |
| 1.5 D | 0.87 | 5.60 |

What is claimed is:

1. An ocular optical system having a wide diopter adjustment range comprising, in order from the viewing side, a first lens component having a negative refracting power, a second lens component having a positive refracting power, a third lens component having a negative refracting power, a pentaprism, and a condenser lens component, wherein the second lens having the positive refracting power is movable for diopter adjustment, said optical system satisfying the following conditions:

$$F_1 < 0, \; 0.7F < |F_1| < F, \quad (1)$$

$$0.35F < F_{1\cdot 2} < 0.55F, \text{ and} \quad (2)$$

$$1.4 < (\nu_2 + \nu_3)/(\nu_1 + \nu_4) < 1.8, \quad (3)$$

where F is the overall focal length of the optical system, $F_{1\cdot 2 \ldots i}$ is the resultant focal length up to the i-th lens group, and $\nu_i$ is the Abbe number of the i-th lens from the viewing side.

2. An ocular optical system having a wide diopter adjustment range comprising, in order from the viewing side, a first lens component having a negative refracting power, a second lens component having a positive refracting power, a third lens component having a negative refracting power, a penta prism and a condenser lens component wherein the second lens component having the positive refracting power is movable for diopter adjustment, said optical system satisfying the following conditions:

| | | F = 60.944 | | | | |
|---|---|---|---|---|---|---|
| $r_1$ | −55.766 | $d_1$ | 0.80 | $n_1$ | 1.76180 | $v_1$ 27.1 |
| $r_2$ | 157.248 | $d_2$ | 1.96 | | | |
| $r_3$ | −211.982 | $d_3$ | 4.37 | $n_2$ | 1.83400 | $v_2$ 37.2 |
| $r_4$ | −33.560 | $d_4$ | 0.20 | | | |
| $r_5$ | 52.212 | $d_5$ | 3.58 | $n_3$ | 1.83481 | $v_3$ 39.6 |
| $r_6$ | −55.371 | $d_6$ | 2.32 | | | |
| $r_7$ | −65.300 | $d_7$ | 1.72 | $n_4$ | 1.84666 | $v_4$ 23.9 |
| $r_8$ | 82.225 | $d_8$ | 1.33 | | | |
| $r_9$ | ∞ | $d_9$ | 81.09 | $n_5$ | 1.51633 | $v_5$ 64.1 |
| $r_{10}$ | ∞ | $d_{10}$ | 1.00 | | | |
| $r_{11}$ | 78.000 | $d_{11}$ | 3.50 | $n_6$ | 1.80518 | $v_6$ 25.4 |
| $r_{12}$ | ∞ | $d_{12}$ | 1.60 | | | |

(1) $F_1 = -0.8852F$
(2) $F_{1\cdot 2} = 0.4319F$
(3) $(v_2 + v_3)/(v_1 + v_4) = 1.569$

| diopter | $d_2$ | $d_6$ |
|---|---|---|
| −2.5 D | 4.06 | 0.22 |
| 1.5 D | 0.49 | 3.79 | where F is the overall focal length of the optical system, $F_{1\cdot 2 \ldots i}$ is the resultant focal length up to the i-th lens component, and $v_i$ is the Abbe number of the i-th lens from the viewing side, $r_i$ is the radius of curvature of the i-th lens from the viewing side, $d_i$ is the difference between adjacent lenses or the lens thickness of the i-th lens from the viewing side, and $N_i$ is the refractive index at the d-line of the i-th lens from the viewing side.

3. An ocular optical system having a wide diopter adjustment range comprising, in order from the viewing side, a first component having a negative refracting power, a second lens component having a positive refracting power, a third lens component having a negative refracting power, a penta prism and a condenser lens component wherein the second lens component having the positive refracting power is movable for diopter adjustment, said optical system satisfying the following conditions:

| | | F = 61.249 | | | | |
|---|---|---|---|---|---|---|
| $r_1$ | −52.604 | $d_1$ | 0.80 | $n_1$ | 1.76180 | $v_1$ 27.1 |
| $r_2$ | 131.327 | $d_2$ | 2.34 | | | |
| $r_3$ | −211.969 | $d_3$ | 3.79 | $n_2$ | 1.83400 | $v_2$ 37.2 |
| $r_4$ | −31.796 | $d_4$ | 0.20 | | | |
| $r_5$ | 55.359 | $d_5$ | 3.65 | $n_3$ | 1.83481 | $v_3$ 42.7 |
| $r_6$ | −50.886 | $d_6$ | 2.73 | | | |
| $r_7$ | −67.402 | $d_7$ | 1.32 | $n_4$ | 1.84666 | $v_4$ 23.9 |
| $r_8$ | 73.364 | $d_8$ | 1.45 | | | |
| $r_9$ | ∞ | $d_9$ | 81.09 | $n_5$ | 1.51633 | $v_5$ 64.1 |
| $r_{10}$ | ∞ | $d_{10}$ | 1.00 | | | |
| $r_{11}$ | 78.000 | $d_{11}$ | 3.50 | $n_6$ | 1.80518 | $v_6$ 25.4 |
| $r_{12}$ | ∞ | $d_{12}$ | 1.60 | | | |

(1) $F_1 = -0.8034F$
(2) $F_{1\cdot 2} = 0.4234F$
(3) $(v_2 + v_3)/(v_1 + v_4) = 1.569$

| diopter | $d_2$ | $d_6$ |
|---|---|---|
| −3.0 D | 4.84 | 0.23 |
| 1.5 D | 0.81 | 4.26 | where F is the overall focal length of the optical system, $F_{1\cdot 2 \ldots i}$ is the resultant focal length up to the i-th lens component, and $v_i$ is the Abbe number of the i-th lens from the viewing side, $r_i$ is the radius of curvature of the i-th lens from the viewing side, $d_i$ is the distance between adjacent lenses or the lens thickness of the i-th lens from the viewing side, and $N_i$ is the refractive index at the d-line of the i-th lens from the viewing side.

4. An ocular optical system having a wide diopter adjustment range comprising, in order from the viewing side, a first lens component having a negative refracting power, a second lens component having a positive refracting power, a third lens component having a negative refracting power, a penta prism and a condenser lens component wherein the second lens component having the positive refracting power is movable for diopter adjustment, said optical system satisfying the following conditions:

| | | F = 62.209 | | | | |
|---|---|---|---|---|---|---|
| $r_1$ | −50.743 | $d_1$ | 0.81 | $n_1$ | 1.76180 | $v_1$ 27.1 |
| $r_2$ | 117.935 | $d_2$ | 2.78 | | | |
| $r_3$ | −179.820 | $d_3$ | 2.88 | $n_2$ | 1.83400 | $v_2$ 37.2 |
| $r_4$ | −32.352 | $d_4$ | 0.10 | | | |
| $r_5$ | 52.848 | $d_5$ | 3.89 | $n_3$ | 1.83481 | $v_3$ 42.7 |
| $r_6$ | −51.064 | $d_6$ | 3.64 | | | |
| $r_7$ | −61.451 | $d_7$ | 0.79 | $n_4$ | 1.84666 | $v_4$ 23.9 |
| $r_8$ | 89.437 | $d_8$ | 1.33 | | | |
| $r_9$ | ∞ | $d_9$ | 81.09 | $n_5$ | 1.51633 | $v_5$ 64.1 |
| $r_{10}$ | ∞ | $d_{10}$ | 1.00 | | | |
| $r_{11}$ | 78.000 | $d_{11}$ | 3.50 | $n_6$ | 1.80518 | $v_6$ 25.4 |
| $r_{12}$ | ∞ | $d_{12}$ | 1.60 | | | |

(1) $F_1 = -0.7471$
(2) $F_{1\cdot 2} = 0.4339$
(3) $(v_2 + v_3)/(v_1 + v_4) = 1.569$

| diopter | $d_2$ | $d_6$ |
|---|---|---|
| −3.0 D | 5.61 | 0.82 |
| 1.5 D | 0.81 | 5.54 | where F is the overall focal length of the optical system, $F_{1\cdot 2 \ldots i}$ is the resultant focal length up to the i-th lens component, and $v_i$ is the Abbe number of the i-th lens from the viewing side, $r_i$ is the radius of curvature of the i-th lens from the viewing side, $d_i$ is the distance between adjacent lenses or the lens thickness of the i-th lens from the viewing side, and $N_i$ is the refractive index at the d-line of the i-th lens from the viewing side.

5. An ocular optical system having a wide diopter adjustment range comprising, in order from the viewing side, a first lens component having a negative refracting power, a second lens component having a positive refracting power, a third lens component having a negative refracting power, a penta prism and a condenser lens component wherein the second lens component having the positive refracting power is movable for diopter adjustment, said optical system satisfying the following conditions:

| | | F = 63.235 | | | | |
|---|---|---|---|---|---|---|
| $r_1$ | −70.000 | $d_1$ | 0.80 | $n_1$ | 1.74077 | $v_1$ 27.8 |
| $r_2$ | 116.372 | $d_2$ | 2.73 | | | |
| $r_3$ | −100.000 | $d_3$ | 2.27 | $n_2$ | 1.88300 | $v_2$ 40.8 |
| $r_4$ | −33.300 | $d_4$ | 0.2 | | | |
| $r_5$ | 47.480 | $d_5$ | 3.41 | $n_3$ | 1.80440 | $v_3$ 47.4 |
| $r_6$ | −62.240 | $d_6$ | 3.75 | | | |
| $r_7$ | −69.147 | $d_7$ | 0.80 | $n_4$ | 1.78472 | $v_4$ 25.7 |
| $r_8$ | 82.000 | $d_8$ | 1.18 | | | |
| $r_9$ | ∞ | $d_9$ | 81.09 | $n_5$ | 1.51633 | $v_5$ 64.1 |
| $r_{10}$ | ∞ | $d_{10}$ | 1.00 | | | |
| $r_{11}$ | 78.000 | $d_{11}$ | 3.50 | $n_6$ | 1.80518 | $v_6$ 25.4 |
| $r_{12}$ | ∞ | $d_{12}$ | 1.60 | | | |

(1) $F_1 = -0.9314F$
(2) $F_{1\cdot 2} = 0.4615F$
(3) $(v_2 + v_3)/(v_1 + v_4) = 1.475$

| diopter | $d_2$ | $d_6$ |
|---|---|---|
| −3.0 D | 5.74 | 0.73 |
| 1.5 D | 0.74 | 5.62 | where F is the overall focal length of the optical system, $F_{1\cdot 2 \ldots i}$ is the resultant focal length up to the i-th lens component, and $\nu_i$ is the Abbe number of the i-th lens from the viewing side, $r_i$ is the radius of curvature of the i-th lens from the viewing side, $d_i$ is the distance between adjacent lenses or the lens thickness of the i-th lens from the viewing side, and $N_i$ is the refractive index at the d-line of the i-th lens from the viewing side.

6. An ocular optical system having a wide diopter adjustment range comprising, in order from the viewing side, a first lens component having a negative refracting power, a second lens component having a positive refracting power, a third lens component having a negative refracting power, a penta prism and a condenser lens component wherein the second lens component having the positive refracting power is movable for diopter adjustment, said optical system satisfying the following conditions:

| | | | | | | | |
|---|---|---|---|---|---|---|---|
| | | | F = 63.207 | | | | |
| $r_1$ | −80.500 | $d_1$ | 0.80 | $n_1$ | 1.80518 | $\nu_1$ | 25.4 |
| $r_2$ | 115.895 | $d_2$ | 2.74 | | | | |
| $r_3$ | −100.000 | $d_3$ | 2.27 | $n_2$ | 1.88300 | $\nu_2$ | 40.8 |
| $r_4$ | −33.300 | $d_4$ | 0.2 | | | | |
| $r_5$ | 47.480 | $d_5$ | 3.41 | $n_3$ | 1.81600 | $\nu_3$ | 46.6 |
| $r_6$ | −64.350 | $d_6$ | 3.73 | | | | |
| $r_7$ | −69.147 | $d_7$ | 0.8 | $n_4$ | 1.80518 | $\nu_4$ | 25.4 |
| $r_8$ | 87.000 | $d_8$ | 1.18 | | | | |
| $r_9$ | ∞ | $d_9$ | 81.09 | $n_5$ | 1.51633 | $\nu_5$ | 64.1 |
| $r_{10}$ | ∞ | $d_{10}$ | 1.00 | | | | |
| $r_{11}$ | 78.000 | $d_{11}$ | 3.50 | $n_6$ | 1.80518 | $\nu_6$ | 25.4 |
| $r_{12}$ | ∞ | $d_{12}$ | 1.60 | | | | |

(1) $F_1 = -0.9317F$
(2) $F_{1\cdot 2} = 0.4617F$
(3) $(\nu_2 + \nu_3)/(\nu_1 + \nu_4) = 1.720$

| diopter | $d_2$ | $d_6$ |
|---|---|---|
| −3.0 D | 5.76 | 0.71 |
| 1.5 D | 0.87 | 5.60 | where F is the overall focal length of the optical system, $F_{1\,2\ldots i}$ is the resultant focal length up to the i-th lens component, and $\nu_i$ is the Abbe number of the i-th lens from the viewing side, $r_i$ is the radius of curvature of the i-th lens from the viewing side, $d_i$ is the distance between adjacent lenses or the lens thickness of the i-th lens from the viewing side, and $N_i$ is the refractive index at the d-line of the i-th lens from the viewing side.

* * * * *